March 8, 1960

S. J. MATCHETT, JR., ET AL 2,927,606

VALVE MECHANISM

Filed Nov. 29, 1954

2 Sheets-Sheet 1

INVENTORS
SAMUEL J. MATCHETT JR.
BY ESTEL C. RANEY

ATTORNEY

March 8, 1960  S. J. MATCHETT, JR., ET AL  2,927,606
VALVE MECHANISM
Filed Nov. 29, 1954
2 Sheets-Sheet 2

INVENTORS
SAMUEL J. MATCHETT JR.
ESTEL C. RANEY
BY
ATTORNEY

United States Patent Office 2,927,606
Patented Mar. 8, 1960

2,927,606

VALVE MECHANISM

Samuel J. Matchett, Jr., Columbus, Ohio, and Estel C. Raney, Fort Lauderdale, Fla., assignors to Ranco Incorporated, Columbus, Ohio, a corporation of Ohio Application November 29, 1954, Serial No. 471,624

2 Claims. (Cl. 137—608)

The present invention relates to three-way poppet type valve mechanisms having a fluid inlet and two fluid outlets adapted to be alternately opened and closed by valve members, the fluid flow being directed through one or the other outlets according to the operation of a relatively low powered pilot device, the power for moving the valve members to their open positions being supplied by the pressure of the fluid passing through the valve mechanism.

The principal object of the invention is to provide a three-way valve mechanism comprising valve means including a piston adapted to be driven in opposite directions to alternately close one and open the other of the two outlet ports and vice versa, the piston being driven by the pressure of the fluid passing through the valve directed to one end or the other thereof by a pilot valve arranged to open and close alternate fluid passages from the inlet to opposite ends of the piston and to the respective outlet ports. The valve means preferably include poppet type valve closures for tight seating, and since the outlet ports are tightly closed the pilot valve closure member need not be of an exceptionally tight seal. Thus, for example, the pilot valve closure could comprise a sliding spool or sleeve arranged to be reciprocated by a solenoid of relatively low power. Furthermore, the valve means in closing either outlet port shuts off the flow passage through the last closed control passage and thereby eliminates pressure differential on opposite sides of the pilot valve closing member so that the pilot valve member may comprise a disc adapted to seat on either of two opposed ports forming openings to the alternate fluid passages mentioned hereinbefore and to be shifted from one of its seats to the other by a relatively small force.

Although the valve mechanism may have numerous uses, it is particularly suitable for use in compressor-condenser-expander refrigerating systems to divert the flow of refrigerant from one heat exchanger to another and may be used in conjunction with other valving to reverse the flow of refrigerant through the normal condenser and evaporator.

Figure 1:
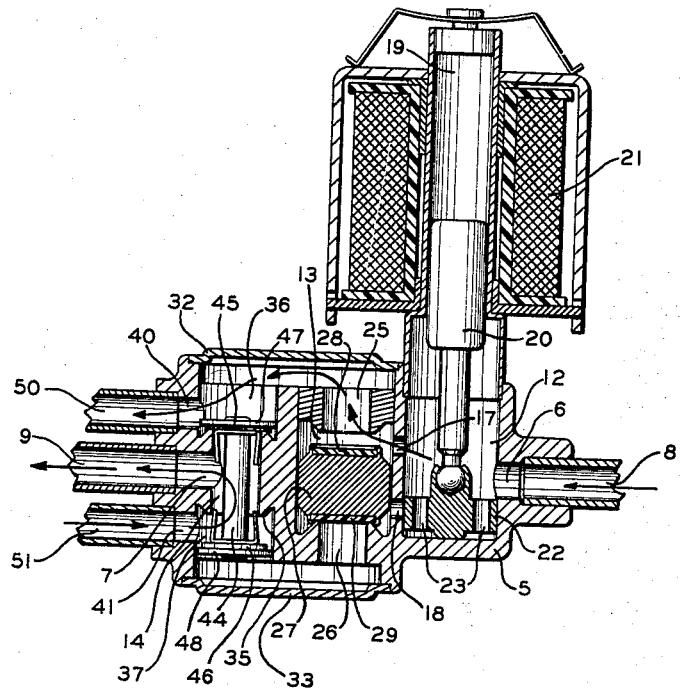
Figure 2:
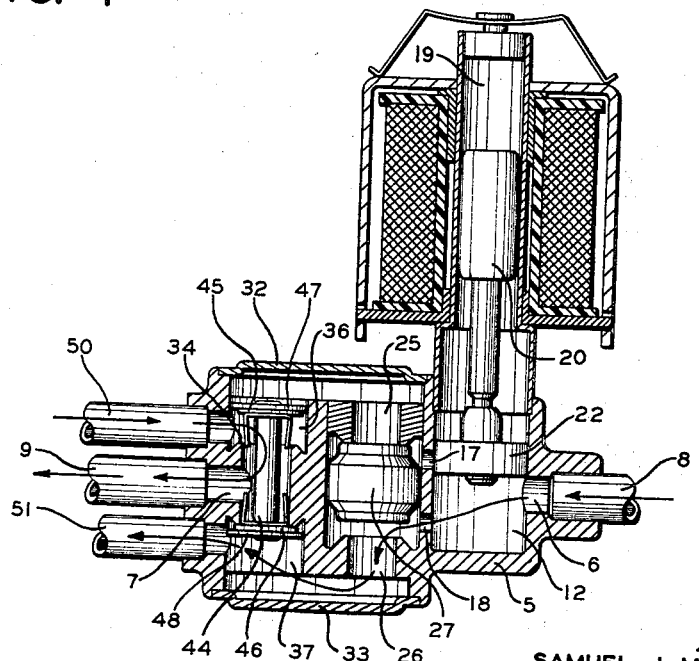
Figure 3:
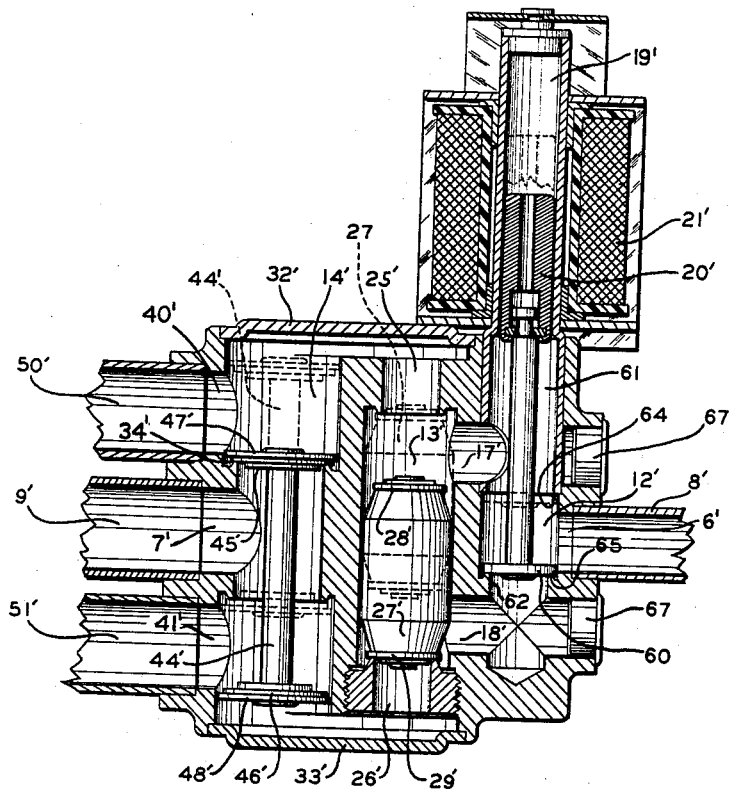

Other objects and advantages of the invention will be apparent from the following description of a preferred form of the invention reference being made to the accompanying drawings wherein Fig. 1 is a sectional view of a reversing valve embodying the invention;

Fig. 2 is a view similar to Fig. 1 but showing certain parts of the valve reversed from the position shown in Fig. 1; and Fig. 3 is a sectional view of another form of reversing valve embodying the invention.

Although the invention may be embodied in valves for various purposes, the form shown is particularly suitable for use in a valving arrangement for a refrigerating system to reverse the order of flow of refrigerant through the condenser and evaporator so that the evaporator can be periodically warmed by the hot gas directly from the compressor to melt frost which usually accumulates thereon, as is well known in the art.

Referring to Figs. 1 and 2 of the drawings, the valve mechanism shown comprises a body 5, which may be of any suitable structure such as a brass forging, and has an inlet opening 6 and an outlet opening 7 at opposite ends. When used in a refrigerating system as mentioned, the inlet 6 is connected with the discharge of the refrigerator compressor by a pipe 8 and the outlet 7 is connected with the intake of the compressor by a pipe 9.

The body has three parallel bores which form chambers 12, 13, 14. The inlet 6 opens into chamber 12, and two passages 17, 18 are formed between the chambers 12 and 13. The passages 17, 18 are of such cross sectional area that they each are capable of carrying the full capacity flow of the valve mechanism. In the form shown, they are slot-like and each has the same cross sectional area as does inlet 6. The chamber 12 is closed at the bottom and the upper end is closed by a sleeve 19 brazed therein, the outer end of which is closed, and the sleeve forms a cylindrical extension of chamber 12 in which an armature 20 reciprocates as a solenoid 21 is energized and deenergized in a manner known in the art.

The armature 20 has a stem to which a tubular sliding valve 22 is attached. The sliding valve has apertures 23 through which the fluid may pass easily as the valve moves axially in the bore, and the sides of the valve substantially close the openings 17 and 18 when the valve is in its raised and lowered positions respectively, as shown in Figs. 1 and 2. The valve 22 need not fit exceptionally snugly in the chamber 12 so that it can be moved freely by the armature 20. It will be seen that when the solenoid 21 is de-energized the valve 22 drops to its lowered position and fluid entering the inlet 6 is diverted through opening 17, and when the solenoid is energized armature 20 raises the valve 22 to a position which closes opening 17 and fluid is then diverted through the opening 18.

The chamber 13 has valve ports 25, 26 at opposite ends around which are formed inwardly facing valve seats through either of which the entire flow of fluid can readily pass. A piston 27 reciprocates in the chamber 13 and has discs 28, 29 attached to its end faces which are of suitable material, such as that known as "Teflon" which forms a good seal for closing the seats of the ports 25, 26 when the piston is moved against the respective seats. It will be seen that the length of the piston is such that when the piston closes one port the other port is open and normally the full flow through the valve is confined to one end or the other of the chamber 13. For example when the piston 27 is in the position shown in Fig. 1 the flow is through passage 17 to port 25, and when the piston closes port 25 the flow is through passage 18 and port 26. In the form shown, the valve seats for ports 25, 26 project inwardly and provide a space between the ends of the piston 27 and the closed portions of the ends of the chamber into which fluid may enter to move the piston from the closed port, as is explained more fully hereinafter.

In the form of the invention shown, the bores or chambers 13, 14 are open ended and caps 32, 33 are brazed to the body 5 to form passages between the adjacent ends of these bores.

The chamber 14 has two ports 34, 35 which have outwardly facing valve seats and they open into the outlets 7, and cylindrical sections 36, 37 are formed outwardly of the respective ports. Reverse flow passages 40, 41 are formed in the sides of the cylinders 36, 37 respectively. A double valve member is provided to alternately close the ports 34, 35 and comprises a stem 44 having valve discs 45, 46 attached to opposite ends, and piston plates 47, 48 are attached outside the respective discs. The length of the stem 44 is such that when either disc 45, 46 closes its seat, the piston plate on the opposite end of the stem is beyond the reverse flow passage for the cylindrical section in which the last mentioned piston plate is moved whereby fluid may flow into the cylindrical section through the open valve seat and into outlet 7, as indicated by arrows in Figs. 1 and 2.

Pipes 50, 51 connect reverse flow passages 40 and 41, with the evaporator and condenser, respectively of the refrigerating system.

The operation of the valve mechanism is as follows:

Normally the solenoid 21 is de-energized and the flow of refrigerant through the valve body is as indicated by the arrows in Fig. 1. It will be appreciated that the refrigerant pressure in the passage formed in part by cap 32 and over piston 47 will be high relative to the pressure in the passage formed in part by cap 33, passage 41 and outlet 7, and therefore the piston 27 is held by this pressure to seat 26 and disc 45 is pressed to seat 34.

When it is desired to defrost the evaporator, the solenoid is energized by any suitable circuit such as a conventional timer operated switch, which raises valve 22 to cover passage 17 and open passage 18. This causes the pressure on the underside of the piston 27 to increase over the pressure above the piston whereupon the piston is raised from the seat of port 26 and refrigerant from the compressor discharge enters the passage formed by cap 33 and forces piston plate 48 to move the valve assembly upwardly and thereby open port 34 and close port 35 which connects the condenser with the high pressure refrigerant supply through the passage formed by cap 33 and connects the evaporator with the intake or low pressure side of the refrigerator compressor through seat 34. This decreases the pressure above the piston 27 so that the piston is forced against the seat of port 25 and positively seals the seat against the flow of refrigerant. The flow of refrigerant is then as shown by the arrows in Fig. 2.

When the defrost cycle is to be terminated, the solenoid 21 is deenergized and valve 22 drops to open passage 17 and close passage 18. This causes the pressure on the top surface of the piston to increase over the pressure on the bottom thereof, whereupon valve port 25 is opened and piston 47 is then subjected to the high pressure fluid passing through the last mentioned port, and disc 46 is moved from port 25 to connect the low pressure outlet 7 with the evaporator through opening 41.

It will be seen that when the piston 27 is operated to its alternate position by shifting of the valve member 22 to close either passage 17 or 18, the closing of the outlet port of chamber 13 shuts off the flow path through the closed one of the passages 17 or 18, thereby relieving or eliminating pressure differentials on the valve member 22. Thus, this valve member does not move against pressure differentials and may be shifted by a minimum force.

In the form of the invention shown in Fig. 3, many elements of this valve mechanism are similar to the valve mechanism described hereinbefore and are indicated by corresponding reference characters having a prime affixed thereto. The principal difference in the two embodiments is the use of a poppet type valve in place of the sleeve valve 22. In the second embodiment a valve disc 60 is attached to the stem of armature 20' and moves between two opposed ports 61, 62 to control the flow of fluid through the passages 17', 18'. The lower end of sleeve 19' is extended below passage 17' and forms a seat 64 against which the disc 60 engages when the solenoid 21' is energized to substantially close off passage 17' to the flow of fluid from the inlet 6' as shown in dotted lines. A seat 65 is formed in the chamber 12' between the inlet 6' and the passage 18'. Seats 64, 65 each has a diameter which accommodates the capacity flow of the valve mechanism.

In the second form of valve body, the passages 17', 18' are formed by drilling from the right-hand end of the body, and plugs 67 are brazed in the end wall to seal the bore openings.

The operation of the valve mechanism shown in Fig. 3 is similar to that of the mechanism shown in Figs. 1, 2. When the solenoid is de-energized the parts are as shown in full lines, the disc 60 resting on seat 65 and the flow of refrigerant through the valve is from inlet 6', seat 64, passage 17' to chamber 13', upwardly through port 25', out reversing passage 40' to the evaporator and condenser, through reversing passage 41' to port 35' and return to the compressor through outlet 7'.

As mentioned previously, when the solenoid is energized, disc 60 is raised to close seat 64 and diverts the incoming gas through passage 18' which forces the piston 27' upwardly, opening port 26' and closing port 25' as shown by the dotted lines. The flow of the high pressure gas is then to the lower end of cylinder 37' which is blocked by disc 48', the pressure forcing the latter upwardly which opens valve disc 45' from the seat of port 34' and disc 46' then closes on seat 35'. The high pressure gas then flows through reverse passage 41' to the evaporator then through the condenser and back through pipe 50' to chamber 14', through seat 34' and back to the compressor intake through outlet 7'.

It will be seen that in both embodiments of the invention, the main valve members 28, 29 or 28', 29' are actuated respectively by the pistons 27 or 27' to positively and tightly close one or the other of the main valve ports and that when the piston moves according to the change in flow of incoming fluid by shifting of the pilot valve, the fluid passage through the port closed by the pilot valve is closed whereby pressures on opposite sides of the pilot valves are equalized by leakage around the piston and through the pilot valve. Consequently, the operation of the pilot valve is practically unaffected by the pressure of the fluid passing through the valve insofar as the shifting of the pilot valve from its closed positions is concerned. In the case of the valve mechanism shown in Fig. 3, the flow of fluid through the open one of the two pilot ports assists in moving the pilot valve disc to its closed position. Thus, the power required to shift the pilot valve in each embodiment is relatively slight and a high pressure differential of the fluid on opposite sides of the main valves when closed will have no effect on the power required to shift the pilot valve.

Valve mechanisms embodying the invention can be compact and the manufacturing tolerances need not be exceptionally close so that the valve mechanism can be inexpensively manufactured.

It is to be understood that the valve mechanism could be employed as a three-way valve by eliminating the chamber 14 or 14' and the valve members in this chamber and providing fluid passages from the ports 25, 26 or 25', 26'.

Although two forms of the invention have been shown and described, other forms, adaptations and modifications could be made all of which embody the invention set forth in the claims which follow.

We claim:

1. Valve mechanism comprising a body including a cylindrical chamber, a piston substantially shorter than said chamber and reciprocable therein, said piston having opposite end surfaces which provide reacting surfaces against which fluid pressure acts to cause said piston to move toward opposite ends of said chamber by reversal in pressure differential at opposite ends of said piston, said chamber having an outlet port at each end thereof, valve means for closing each of said outlet ports and operatively connected with said piston and actuated thereby to close the outlet port at the end of said chamber toward which said piston moves and to simultaneously open the other outlet port as said piston moves therefrom whereby one or the other of said ports is open at all times, and means to increase the pressure at one end of said piston above the pressure at the opposite end to drive said piston toward said opposite end comprising, two fluid inlets opening into said chamber at opposite ends thereof and located to direct fluid between said outlet ports and the end surfaces of said piston facing the respective outlet ports, and means to selectively close one inlet and open the other whereby fluid under pressure may be directed into whichever end of said chamber the outlet port therein is closed to thereby increase the pressure in that end of the chamber above the opposite end to cause shifting of said piston.

2. Valve mechanism comprising, a body having a cylindrical chamber, said chamber having a coaxial outlet port at each end thereof, a piston reciprocable in said chamber, two valve members carried on opposite ends of said piston and operative to alternately open and close said outlet ports when said piston moves from one end of said chamber to the other, said valve members having a lesser diameter than the ends of said piston whereby a reacting surface is provided at opposite ends of said piston against which fluid pressure may operate to drive said piston from one end of said chamber toward the other, said chamber having fluid inlets into opposite ends thereof arranged to admit fluid into either end of said chamber between said outlet ports and the reacting surfaces of said piston facing the respective outlet ports, and valve means to control a flow of fluid alternately to one or the other of said inlets.

References Cited in the file of this patent
UNITED STATES PATENTS

| | | |
|---|---|---|
| 322,388 | Lord | July 14, 1885 |
| 2,396,984 | Broadston | Aug. 2, 1944 |
| 2,474,304 | Clancy | June 28, 1949 |
| 2,511,779 | Leonard | June 13, 1950 |
| 2,525,560 | Pabst | Oct. 10, 1950 |
| 2,638,123 | Vargo | May 12, 1953 |
| 2,672,016 | Muffy | Mar. 16, 1954 |